US012718780B2

(12) United States Patent
Cho et al.

(10) Patent No.: US 12,718,780 B2
(45) Date of Patent: Aug. 25, 2026

(54) APPARATUS AND METHOD FOR TRANSMITTING AND RECEIVING DATA

(71) Applicant: LX SEMICON CO., LTD., Daejeon (KR)

(72) Inventors: Hyun Pyo Cho, Daejeon (KR); Myung Yu Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 19/013,714

(22) Filed: Jan. 8, 2025

(65) Prior Publication Data

US 2025/0225948 A1 Jul. 10, 2025

(30) Foreign Application Priority Data

Jan. 8, 2024 (KR) ........................ 10-2024-0003184
Jan. 3, 2025 (KR) ........................ 10-2025-0001082

(51) Int. Cl.
*G09G 3/36* (2006.01)
*G09G 5/00* (2006.01)

(52) U.S. Cl.
CPC ........... *G09G 3/3685* (2013.01); *G09G 5/003* (2013.01)

(58) Field of Classification Search
CPC .. G09G 3/3685; G09G 5/003; G09G 2370/04; G09G 2370/08; G09G 2370/10; G09G 3/20; G09G 2310/0275; G09G 2310/08; G09G 2320/0693; G09G 2300/0426; G09G 2310/027; G09G 2352/00; G09G 2370/14; G09G 3/2096
See application file for complete search history.

(56) References Cited

U.S. PATENT DOCUMENTS

2011/0037758 A1* 2/2011 Lim ...................... H03L 7/0805 345/213
2011/0181558 A1* 7/2011 Jeon ..................... G09G 3/3611 345/204
2014/0078133 A1* 3/2014 Lee ...................... G09G 3/2092 345/213
2014/0118235 A1* 5/2014 Hong ..................... G09G 5/008 345/87
2016/0125840 A1* 5/2016 Oh ......................... G09G 5/006 345/76
2020/0090616 A1* 3/2020 Duan ................... G09G 3/3685
2021/0335291 A1* 10/2021 Duan ........................ G09G 3/36
2021/0358359 A1* 11/2021 Yu ............................ G09G 3/20
2023/0206885 A1* 6/2023 Kwon .................... G09G 5/395 345/530
2024/0153435 A1* 5/2024 Park ..................... G09G 3/2096

* cited by examiner

*Primary Examiner* — Md A Siddiqui
(74) *Attorney, Agent, or Firm* — POLSINELLI PC

(57) ABSTRACT

A data transmission and reception apparatus includes a data processing device that transmits a start signal for entering an ID assignment phase to multiple data driving parts through a second communication line, and transmits different identification patterns to the multiple data driving parts through a first communication line; and a data driving device including multiple data driving parts that train the different identification patterns and recognize the identification patterns as their own IDs.

15 Claims, 9 Drawing Sheets

APPARATUS AND METHOD FOR TRANSMITTING AND RECEIVING DATA

CROSS-REFERENCE TO RELATED APPLICATIONS

This application claims the priorities of Korean Patent Applications No. 10-2024-0003184, filed on Jan. 8, 2024 and No. 10-2025-0001082, filed on Jan. 3, 2025, which are hereby incorporated by reference in their entirety.

BACKGROUND

Field of the Disclosure

The present disclosure relates to a technology for assigning IDs in data driving parts.

Description of Background

A display panel is composed of multiple pixels arranged in a matrix format. Each pixel may have colors such as R (red), G (green), B (blue), and displays images on the display panel by emitting light at greyscale levels according to image data.

Image data is transmitted from a data processing device, such as a timing controller, to a data driving device, such as a source driver. While the image data is transmitted as digital values, the data driving device converts the image data into analog voltages to drive each pixel.

A data transmission and reception apparatus composed of a timing controller and a source driver may communicate through a bidirectional auxiliary channel and a unidirectional main channel. Since multiple data driving devices are connected to the bidirectional auxiliary channel, it is necessary to set unique IDs to the data driving devices for communication with their respective source drivers.

SUMMARY

Accordingly, the present disclosure is directed to an apparatus and a method for transmitting and receiving data that substantially obviate one or more of problems due to limitations and disadvantages described above.

More specifically, the present disclosure is to provide a data transmission and reception apparatus and method that may quickly assign unique IDs to multiple source drivers.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a data transmission and reception apparatus includes: a data processing device which transmits a start signal for entering an ID assignment phase to multiple data driving parts through a second communication line, and transmits different identification patterns to the multiple data driving parts through a first communication line; and a data driving device including the multiple data driving parts which train the different identification patterns and recognize the identification pattern as their own IDs.

The data processing device may sequentially transmit commands through the second communication line to the multiple data driving parts to check if training of the identification patterns is complete, and the commands may be transmitted together with the different identification patterns.

The multiple data driving parts may simultaneously receive the commands through the second communication line, and the data driving part that has stored the identification pattern transmitted with the command as its ID may transmit a response signal through the second communication line.

The multiple data driving parts may sequentially receive the commands through the second communication line, and the data driving part that has stored the identification pattern transmitted with the command as its ID may transmit a response signal to a neighboring data driving part through a lock link of the second communication line.

The response signal may include its own identification pattern.

The data processing device may transmit a termination signal indicating completion of the ID assignment phase when transmission of the different identification patterns is complete.

The data processing device may transmit clock training patterns to the multiple data driving parts for display mode operation when the ID assignment phase for the multiple data driving parts is complete.

The clock training patterns transmitted to the multiple data driving parts may have a same phase and period.

The multiple data driving parts may change the lock signal and transmit it to the data processing device when clock training is complete.

In another aspect of the present disclosure, a data transmission and reception method includes: transmitting, by a data processing device, a start signal through a second communication line to multiple data driving parts for entering an ID assignment phase; transmitting different identification patterns to the multiple data driving parts through a first communication line; and training, by the multiple data driving parts, their respectively received identification patterns and recognizing them as their own IDs.

The data transmission and reception method may further include: after transmitting the different identification patterns, sequentially transmitting commands through the second communication line to the multiple data driving parts to check if training of identification patterns is complete, wherein the commands are transmitted together with the different identification patterns.

The data transmission and reception method may further include: transmitting, by the data processing device, a termination signal indicating completion of the ID assignment phase when transmission of the different identification patterns is complete.

The data transmission and reception method may further include: after transmitting the termination signal, transmitting clock training patterns with a same phase and period to all of the multiple data driving parts.

According to the aspect, the time for assigning IDs to multiple source drivers may be reduced.

According to the aspect, additional circuit configurations such as a Voltage Level Detector for assigning IDs to source drivers may be omitted.

According to the aspect, there is an advantage that additional pins for source driver Chip Select may be omitted.

The effects of the present disclosure are not limited to the effects mentioned above, and other effects not mentioned will be clearly understood by those skilled in the art from the recitation of the claims.

BRIEF DESCRIPTION OF THE DRAWINGS

The above and other features and advantages of the present disclosure will become more apparent to those of ordinary skill in the art by describing exemplary aspects thereof in detail with reference to the attached drawings, in which.

DETAILED DESCRIPTION

Figure 1:
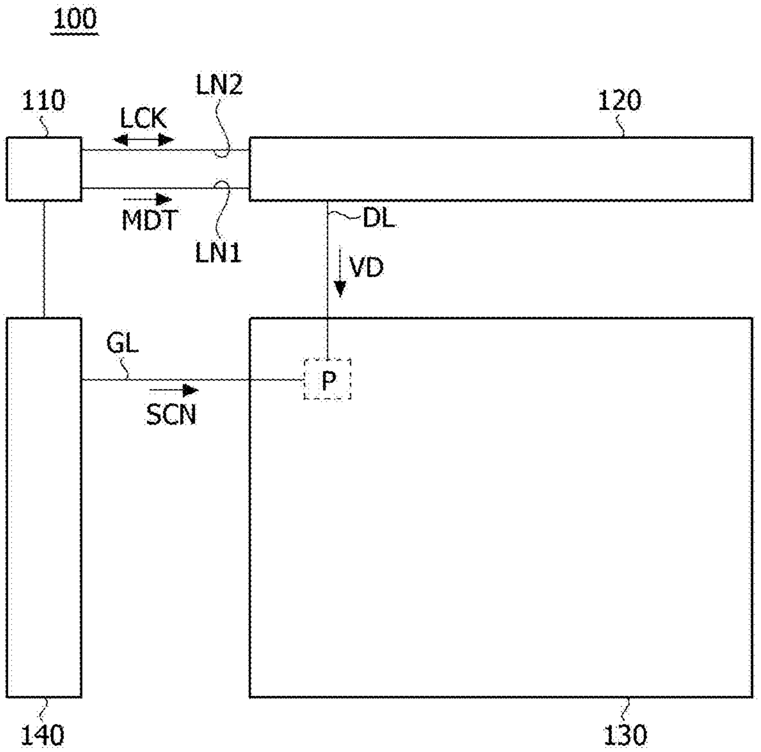
FIG. 1 is a conceptual diagram of a display apparatus according to an aspect of the present disclosure.

The advantages and features of the present disclosure, and methods of achieving them will be apparent from the aspects described in detail below in conjunction with the accompanying drawings. However, the present disclosure is not limited to the following aspects, which may be implemented in various different forms; rather, the present aspects are provided to make the disclosure of the present disclosure complete and to allow those skilled in the art to fully understand the scope of the present disclosure, and the present disclosure is defined only within the scope of the appended claims.

The shapes, sizes, proportions, angles, numbers and the like shown in the accompanying drawings for the purpose of describing the aspects of the present disclosure are merely examples, and the present disclosure is not limited thereto. Like reference numerals generally denote like elements throughout the present specification. Further, in describing the present disclosure, detailed descriptions of known related technologies may be omitted so as not to unnecessarily obscure the subject matter of the present disclosure.

The following aspects may be combined or associated with each other in whole or in part, and various types of interlocking and driving are technically possible. The aspects may be implemented independently of each other or together in an interrelated relationship.

Various aspects of the present disclosure will be described in detail with reference to the accompanying drawings.

FIG. 1 is a configuration diagram of a display apparatus according to an aspect.

Referring to FIG. 1, the display apparatus 100 may include a data processing device 110, a data driving device 120, a display panel 130, and a gate driving device 140, etc.

The data processing device 110 may receive image data from another device. The another device may be a host that generates the image data.

The data processing device 110 may process image data received from another device to be suitable for the data driving device 120 and transmit the processed image data to the data driving device 120. The data processing device 110 may perform digital gamma correction processing on greyscale values included in the image data for each pixel, or may perform compensation processing according to the characteristics of each pixel.

The data driving device 120 may receive image data from the data processing device 110, generate data voltage VD according to the greyscale of the pixel included in the image data, and supply the data voltage VD to the corresponding pixel P.

The display panel 130 includes multiple pixels P arranged in a matrix. Each pixel P is connected to the data driving device 120 through a data line DL and to the gate driving device 140 through a gate line GL.

The display panel 130 may be a panel of flat panel displays such as Liquid Crystal Display (LCD), Field Emission Display (FED), Plasma Display Panel (PDP), Organic Light Emitting Display (OLED), or Non-Organic Light Emitting Display, etc.

Each pixel P may include a transistor, with its gate terminal connected to the gate line GL and source terminal connected to the data line DL. When the gate driving device 140 supplies a scan signal SCN to the gate line GL, the transistor turns on so that the data line DL is connected to the pixel P. After the data line DL is connected to the pixel P, the data voltage VD supplied by the data driving device 120 is transferred to the pixel P.

To synchronize timing between the gate driving device 140 and data driving device 120, the data processing device 110 may transmit timing control signals to the gate driving device 140 and the data driving device 120.

The data processing device 110 may transmit a gate control signal to the gate driving device 140. The gate control signal may include the aforementioned timing control signal. The gate driving device 140 may generate a scan signal SCN according to the gate control signal and supply the scan signal SCN to pixels P through gate lines GL.

At least two types of communication lines LN1, LN2 may be arranged between the data processing device 110 and the data driving device 120. The data processing device 110 may transmit a first communication signal MDT through a first communication line LN1, and may transmit or receive a second communication signal LCK through a second communication line LN2. The second communication signal may include various status check messages.

The first communication line LN1 may be defined as the main communication line or main channel, while the second communication line LN2 may be defined as the auxiliary communication line or auxiliary channel. The first communication signal MDT may be defined as the main communication signal and the second communication signal LCK may be defined as the auxiliary communication signal.

The data processing device 110 may transmit image data and timing control signals to the data driving device 120 through the first communication line LN1, and the data driving device 120 may transmit status information to the data processing device 110 through the auxiliary communication signal LCK.

Figure 2:
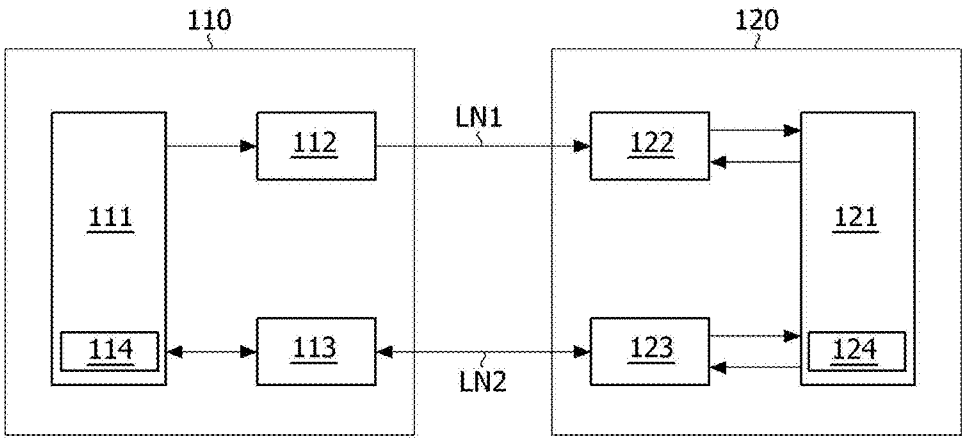
FIG. 2 is a configuration diagram of a data processing device and data driving device according to an aspect of the present disclosure.
Figure 3:
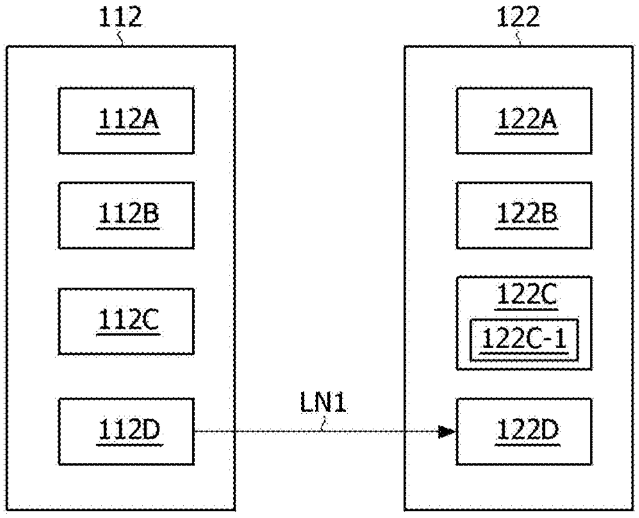
FIG. 3 a diagram illustrating the first main communication part and second main communication part according to an aspect of the present disclosure.

FIG. 2 is a configuration diagram of the data processing device and the data driving device according to an aspect of the present disclosure. FIG. 3 is a diagram illustrating a first main communication part and a second main communication part according to an aspect of the present disclosure.

Referring to FIG. 2 and FIG. 3, the data processing device 110 may include a transmission controller 111, a first main communication part 112, and a first auxiliary communication part 113. The data driving device 120 may include a reception controller 121, a second main communication part 122, and a second auxiliary communication part 123.

The first main communication part 112 and the second main communication part 122 may be connected through the first communication line LN1. The first main communication part 112 may transmit control data and image data to the second main communication part 122 through the first communication line LN1.

The first auxiliary communication part 113 and the second auxiliary communication part 123 may be connected through the second communication line LN2. The first auxiliary communication part 113 and the second auxiliary communication part 123 may transmit auxiliary communication signals through the second communication line LN2.

The main communication signal MLP may include image data indicating greyscale values for pixels, while the auxiliary communication signal ALP may include signals indicating clock training status in the data driving device 120, status check signals, etc.

The first main communication part 112 may include a scrambler 112A, an encoder 112B, a P2S (parallel-to-serial) converter 112C, and a transmitter 112D, while the second main communication part 122 may include a receiver 122D, an S2P (serial-to-parallel) converter 122C, a decoder 122B, and a descrambler 122A, etc.

The image data is scrambled by the scrambler 112A. Scrambling is a process of mixing bits of transmitted data to prevent the same bit from being placed consecutively K times or more (where K is a natural number greater than or equal to 2) in the transmission stream. Scrambling is performed according to predetermined protocols, and the descrambler 122A may perform the function of restoring the mixed bit stream back to its original data state.

The encoder 112B may encode P bits of data in the transmission stream into Q bits. For example, P may be 8 and Q may be 10. Encoding 8-bit data into 10-bit data is defined as 8B10B encoding. 8B10B encoding is a type of DC balance code encoding method. According to the aspect, not only image data but also control data for one horizontal line may be encoded to improve data recovery rate, thereby improving image quality.

The encoder 112B may encode data to increase bits of transmission stream. Furthermore, the encoded data may be decoded by the decoder 122B by DC balanced code—for example, 8B10B. In another aspect, the encoded data may be restored to its original bits by the decoder 122B.

The encoder 112B may also use Limited Run Length Code (LRLC) for data encoding. “Run Length” refers to consecutive placement of identical bits, and LRLC is used to control specific bits intermittently in the data to prevent “Run Length” from appearing above a certain size.

When the encoder 112B uses LRLC to encode data, the decoder 122B may decode the data according to the LRLC method used by the encoder 112B.

Data transmitted in parallel within the data processing device may be converted to serial form for transmission between the data processing device and the data driving device. The parallel-to-serial conversion may be performed by the P2S converter 112C. The S2P converter 122C may perform the function of converting serially received data back to parallel form.

The serialized data may be transmitted to the data driving device through the transmitter 112D of the data processing device. At this time, the data may be transmitted through the first communication line LN1 in the form of a main communication signal MLP.

The data received at the data driving device may be transmitted to the decoder 122B and the descrambler 122A through the receiver 122D and the S2P converter 122C.

The transmitter 112D may transmit data through at least one first communication lines LN1. Furthermore, each first communication line LN1 may be composed of two signal lines for transmitting signals in a differential manner. When multiple first communication lines LN1 are used, the transmitter 112D may distribute and transmit data through the multiple first communication lines LN1. Furthermore, the receiver 122D may compose data by combining signals received in a distributed manner through the multiple first communication lines LN1.

The S2P converter 122C may include a clock recovery part 122C-1. The clock recovery part 122C-1 may train identification patterns to extract its own ID. Subsequently, the clock recovery part 122C-1 may perform training on clock training patterns to recover the clock for driving display mode. The clock recovery part 122C-1 may recover data using the recovered clock, and if the recovered data matches the reference data, the recovered clock may be used for communication with the data processing device 110. The clock recovery part 122C-1 may recover the clock using PLL (Phase Locked Loop) method, although not limited thereto. For example, the clock recovery part 122C-1 may also use DLL (Delay-Locked Loop) method.

According to the aspect, the first transmitter 111 may include a first memory 114 which stores identification patterns to be assigned to multiple data driving devices. During the ID assignment phase which will be described later, the data processing device 110 may transmit different identification patterns stored in the first memory 114 to each data driving device 120 through the first communication line LN1. When the clock recovery part of the S2P converter 122C in the data driving device 120 trains the identification pattern received through the first communication line LN1, the data driving device 120 may store that identification pattern in the second memory 124.

Figure 4:
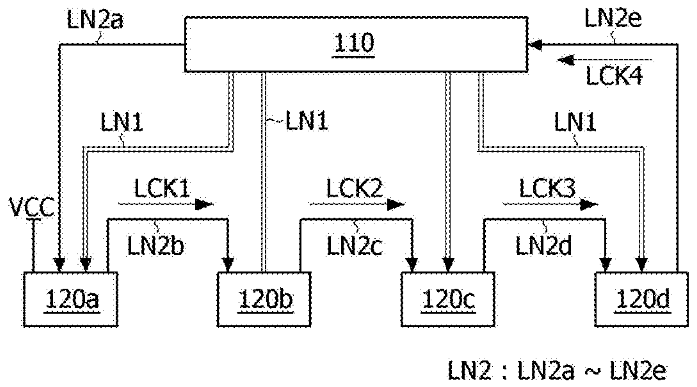
FIG. 4 shows main communication and auxiliary communication between the data processing device and data driving device according to an aspect of the present disclosure.
Figure 5:
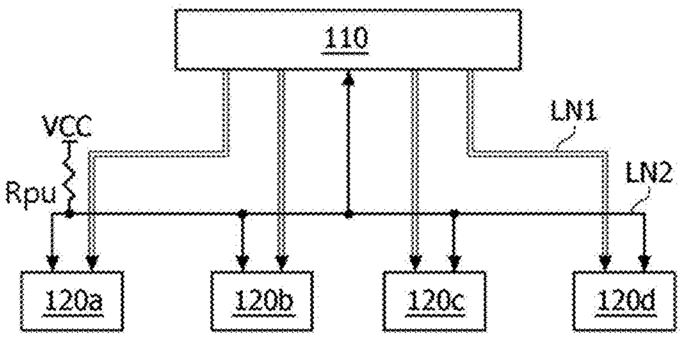
FIG. 5 shows alternative main communication and auxiliary communication arrangements between the data processing device and data driving device according to an aspect of the present disclosure.

FIG. 4 is a diagram illustrating main communication and auxiliary communication between the data processing device and the data driving device according to an aspect of the present disclosure. FIG. 5 is a diagram illustrating main communication and auxiliary communication between the data processing device and the data driving device according to an aspect of the present disclosure.

Referring to FIG. 4, the data driving device may include multiple data driving parts (a plurality of data drivers) 120*a*, 120*b*, 120*c*, 120*d*. The multiple data driving parts 120*a*, 120*b*, 120*c*, 120*d* may be source drivers or data driving integrated circuits. The data processing device 110 may communicate with the multiple data driving parts through the first communication lines LN1. The first communication line LN1 may be connected one-to-one with each data driving part 120*a*, 120*b*, 120*c*, and 120*d*.

Each first communication line LN1 may be composed of m electrically isolated lines (where m is a natural number). Furthermore, these m lines may form pairs, with each pair enabling LVDS (Low Voltage Differential Signaling) communication.

The data processing device 110 and multiple data driving parts 120*a*, 120*b*, 120*c*, 120*d* may exchange information through the second communication line LN2.

Among multiple data driving parts 120*a*, 120*b*, 120*c*, 120*d*, the second communication line LN2 may be connected in a cascade form forming multiple lock links. The first data driving part 120*a* may receive signals from the data processing device 110 through a first lock link LN2*a*. The first data driving part 120*a* and the second data driving part 120*b* may be connected through a second lock link LN2*b*, and the second data driving part 120*b* and the third data driving part 120*c* may be connected through a third lock link LN2*c*. The third data driving part 120*c* and the fourth data driving part 120*d* may be connected through a fourth lock link LN2*d*, and the fourth data driving part 120*d* may be connected to the data processing device 110 through a feedback link LN2*c*.

The first to fourth data driving parts 120*a*-120*d* may transmit lock signals through the lock links. A lock signal indicates the completion status of the clock training among clock training status signals. The fourth data driving part 120*d* may transmit the lock signal to the data processing device 110. Here, the lock signal may indicate the communication status of at least one of the data driving parts. If a lock fail occurs in any of the first to fourth data driving parts 120*a*-120*d*, the lock signal may be switched to a value indicating an abnormal communication state. A lock fail signal indicates that the link between the data processing device 110 and data driving device 120 is broken. The data driving device 120 counts fail signals, and if the fail signals occur N or more times (where N is a natural number), the data driving device 120 may transmit a signal changing the clock training status through the second communication line LN2 connected to the data processing device 110.

Referring to FIG. 5, the data processing device 110 and multiple data driving devices 120 may be connected 1:1 through multiple first communication lines LN1. Additionally, the data processing device 110 and multiple data driving devices 120 may be connected through a second communication line LN2 configured as a common bus.

The second communication line LN2 may be a single signal line driven by open-drain. A pull-up resistor Rpu may be connected to the second communication line LN2, with one side of the pull-up resistor connected to the second communication line LN2 and the other side supplied with a driving voltage VCC.

Multiple data driving parts 120*a*, 120*b*, 120*c*, 120*d* may be connected to the second communication line LN2, implementing a multi-drop configuration through these connections.

The data processing device 110 may transmit clock-embedded image data to the data driving device 120 through the first communication line LN1. Furthermore, the data processing device 110 and data driving device 120 may exchange various information through the second communication line LN2.

Figure 6:
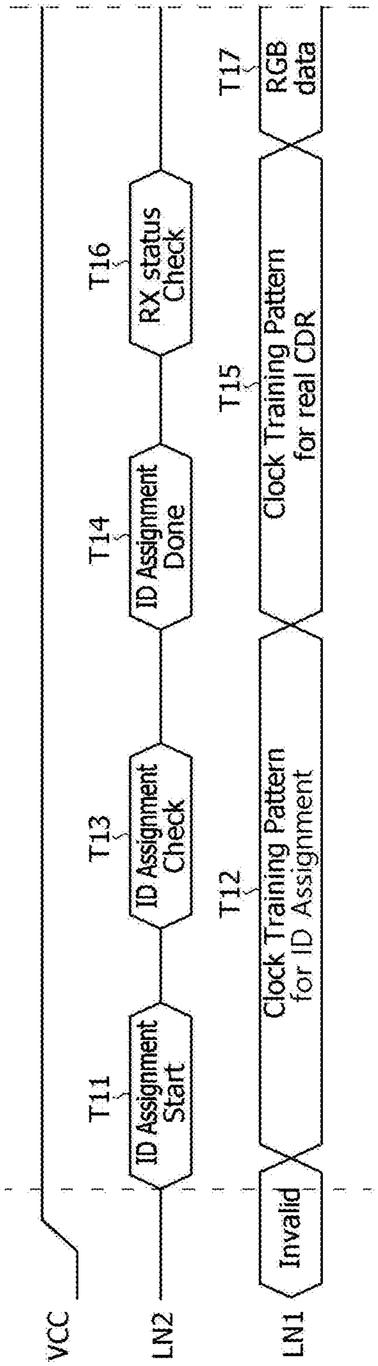
FIG. 6 is a sequence diagram showing the process of assigning IDs to multiple data driving parts.
Figure 7:
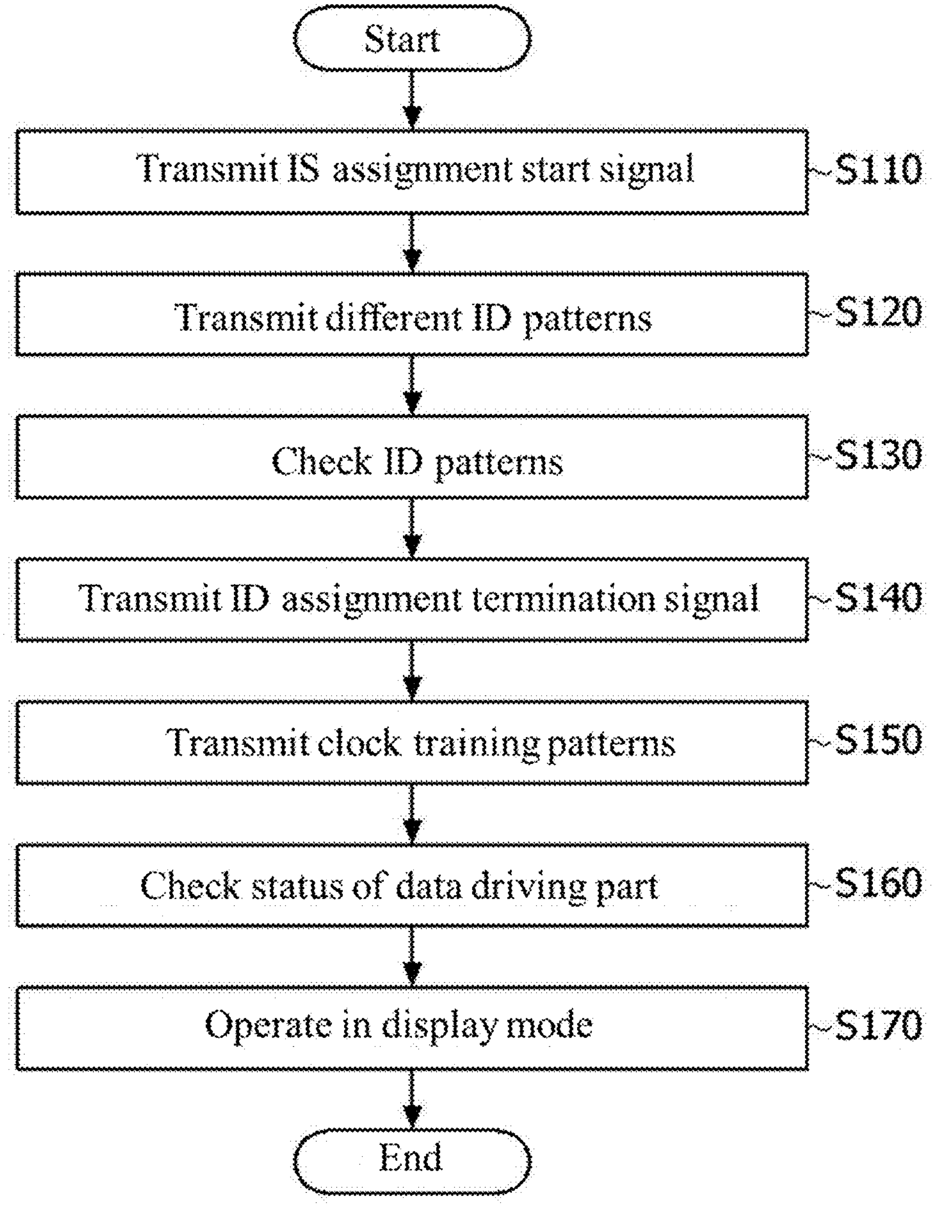
FIG. 7 is a flowchart showing the process of assigning IDs to multiple data driving parts.
Figure 8:
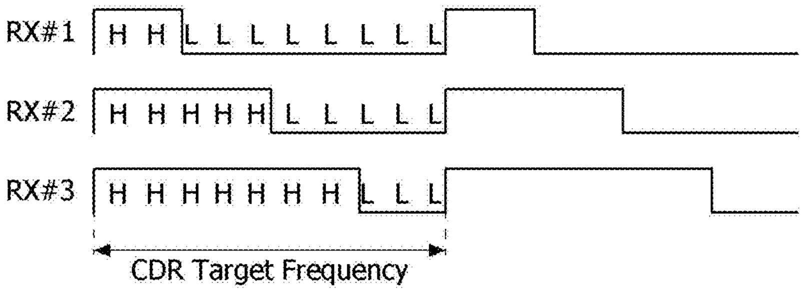
FIG. 8 shows identification patterns according to an aspect of the present disclosure.
Figure 9:
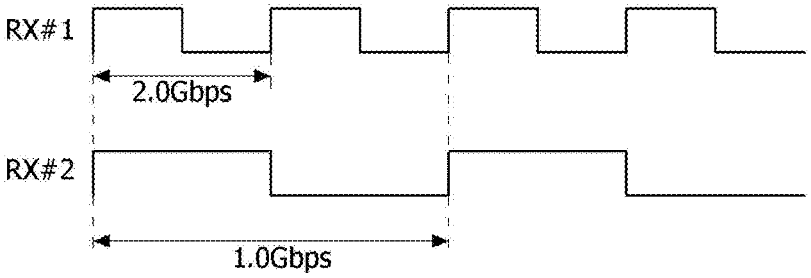
FIG. 9 shows identification patterns according to another aspect of the present disclosure.
Figure 10:
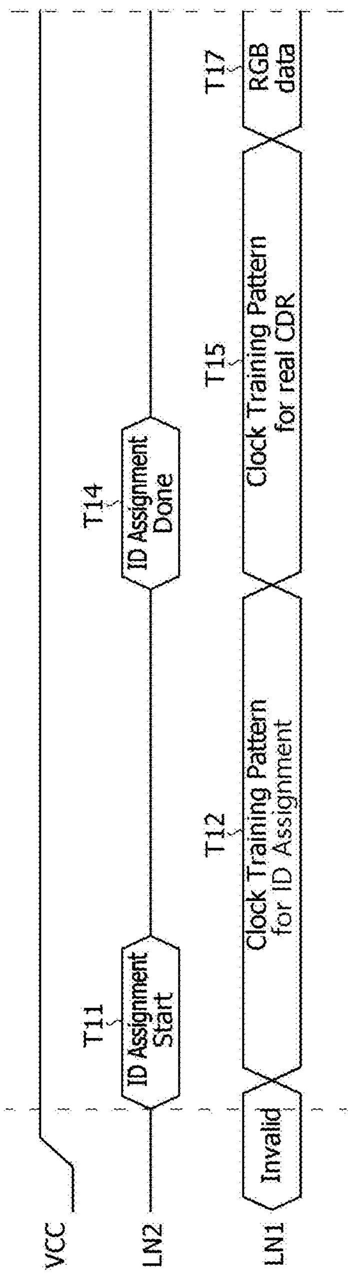
FIG. 10 is a flowchart showing an alternative process of assigning IDs to multiple data driving parts.

FIG. 6 is a sequence illustrating a process of assigning IDs to multiple data driving parts according to an aspect of the present disclosure. FIG. 7 is a flowchart illustrating a process of assigning IDs to multiple data driving parts according to an aspect of the present disclosure. FIG. 8 is a diagram illustrating identification patterns according to an aspect of the present disclosure. FIG. 9 is a diagram illustrating identification patterns according to another aspect of the present disclosure. FIG. 10 is a flowchart illustrating a process of assigning IDs to multiple data driving parts according to another aspect of the present disclosure.

Referring to FIG. 6 and FIG. 7, the method of assigning IDs to multiple data driving parts may include: transmitting an ID assignment start signal (S110); transmitting different identification patterns (S120); checking identification patterns (S130); transmitting an ID assignment termination signal (S140); transmitting clock training patterns (S150); checking status of the data driving part (S160); and operating in display mode (S170).

In the step of transmitting a start signal S110, when power is turned on, the data processing device 110 may apply a start signal through the second communication line LN2 to enter the ID assignment phase T11. Since the second communication line LN2 is connected to each of the multiple data driving parts 120*a*-120*d*, the multiple data driving parts 120*a*-120*d* may each receive the start signal and recognize entry into the ID assignment phase.

The second communication line LN2 of the multiple data driving parts 120*a*-120*d* may be connected either in cascade mode or multi-drop mode. The present aspect is explained based on the connection in multi-drop mode.

In the step of transmitting identification patterns S120, the data processing device 110 may simultaneously or sequentially transmit different identification patterns to the multiple data driving parts 120*a*-120*d* through the first communication line LN1 T12. For example, as shown in FIG. 8, 10-bit identification patterns may be continuously transmitted to each data driving part 120*a*-120*d*.

The data processing device 110 may repeatedly transmit a first identification pattern RX1 with bits '1100000000' to the first data driving part 120*a*. The clock recovery part of the first data driving part 120*a* trains the first identification pattern RX1 and recognizes the first identification pattern as its own ID. The first data driving part 120*a* may store the trained first identification pattern in the memory 124.

The data processing device 110 may repeatedly transmit a second identification pattern RX2 with bits '1111100000' to the second data driving part 120*b*. The clock recovery part of the second data driving part 120*b* trains the second identification pattern RX2 and stores the second identification pattern as its own ID in the memory 124.

The data processing device 110 may repeatedly transmit a third identification pattern RX3 with bits '1111111100' to the third data driving part 120*c*. The clock recovery part of the third data driving part 120*c* trains the third identification pattern RX3 and stores the third identification pattern as its own ID in the memory 124.

In this way, identification patterns having different bit arrangements are transmitted to each of the multiple data driving parts 120*a*-120*d*, and each identification pattern may be stored as its own ID through training. When the bit arrangement of the identification pattern differs, the duty cycle differs, allowing recognition of different IDs.

However, the different identification patterns transmitted to the data driving parts 120*a*-120*d* are not limited to signals with different duty cycles, for example, as shown in FIG. 8. For example, as shown in FIG. 9, signals with different frequencies may be transmitted and assigned as IDs to each data driving part 120*a*-120*d*. Alternatively, identification patterns may be generated using signals with both different duty cycles and frequencies.

According to the aspect, by transmitting identification patterns through the first communication line LN1 and having each part train and store its identification pattern as an ID, the time required to assign IDs to multiple data driving parts may be reduced. Additionally, there is the advantage of being able to omit additional circuit configurations such as Voltage Level Detectors or pins for ID assignment. When using multiple pins, each pin must be connected to low and high voltages, which increases manufacturing costs and takes longer to assign IDs.

In the step of checking identification patterns S130, the data processing device 110 may request transmission of the trained identification pattern through the second communication line LN2 to check if the identification pattern training is complete T13.

For example, the data processing device 110 may transmit a command through the second communication line LN2 to the first data driving part 120*a* requesting the first data driving part 120*a* to send its trained identification pattern. The command may include the identification pattern of the first data driving part 120*a*.

Consequently, while all data driving parts 120*a*-120*d* receive the command through the second communication line LN2, only the first data driving part 120*a* that trained the corresponding identification pattern may respond to the command. The first data driving part 120*a* may transmit its trained identification pattern to the data processing device 110 through the second communication line LN2.

In this way, by transmitting commands along with identification patterns, the completion of ID assignment for each data driving part 120*a*-120*d* may be checked sequentially.

In the cascade configuration, among the multiple data driving parts 120*a*-120*d*, a data driving part that has completed identification pattern training may transmit its identification pattern through the second communication line LN2 in response to the request. The identification pattern transmitted from the data driving part may pass through the lock channels of neighboring data driving parts 120*a*-120*d* and be ultimately delivered to the data processing device 110.

In the step of notifying the termination of ID assignment S140, when transmission of identification pattern is complete, the data processing device 110 may transmit a command indicating the termination of the ID assignment phase T14.

In the step of transmitting clock training patterns S150, the data processing device 110 may transmit clock training patterns with identical phase and period to the multiple data driving parts 120*a*-120*d* T15. However, the aspects are not limited to this approach. For example, clock training may be possible using the identification patterns transmitted to the multiple data driving parts 120*a*-120*d*. Since identification patterns are also repetitive patterns, the clock trained by the identification pattern may be used to recover clock and image data from clock-embedded data transmitted in display mode.

The identification pattern may be set to a frequency band that may be recovered by the clock recovery part, and may be set to a pattern identical or similar to the clock training pattern of the display mode or to a similar frequency band. Therefore, using a clock generated by training the identification pattern may omit separate clock training. In this case, all clocks of the clock recovery parts used to recover clocks and image data in display mode may be different for multiple data driving parts 120*a*-120*d*.

In the step of checking the status of the data driving part S160, the data processing device 110 may transmit a command through the second communication line LN2 to check if clock and data recovery are being performed normally to the multiple data driving parts 120*a*-120*d* T16.

The multiple data driving parts 120*a*-120*d* may transmit their current status information along with their identification patterns through the second communication line LN2. By receiving status information along with identification patterns, the data processing device 110 may determine which data driving part is in what state.

In the step of operating in display mode S170, the data processing device may transmit image data and control data using a high-speed protocol T17. The multiple data driving parts 120*a*-120*d* may recover clock and image data in display mode since clock training is complete. Display mode may be a phase where each data driving part's settings are complete and images are output to the display panel.

During the display mode phase, the data processing device 110 and multiple data driving parts 120*a*-120*d* may exchange various information including link training completion status, equalizer status information, and data errors, etc. At this time, when transmitting status information, the multiple data driving parts 120*a*-120*d* may include their identification patterns in the transmission. Therefore, the data processing device 110 may determine which data driving part transmitted the status information by checking the identification pattern.

Referring to FIG. 10, the data processing device 110 may transmit an ID assignment start signal to multiple data driving parts 120*a*-120*d* through the second communication line LN2 and transmit identification patterns to the multiple data driving parts 120*a*-120*d*. Thereafter, without transmitting a command to check if ID assignment was performed normally, the data processing device 110 may transmit a termination signal for the ID assignment phase through the second communication line LN2 when identification pattern transmission ends.

Additionally, the data processing device 110 may omit the step of transmitting clock training patterns for clock training and/or the step of transmitting commands to check if clock training operation was performed normally. This configuration allows quicker completion of the ID assignment phase and entry into display mode.

Figure 11:
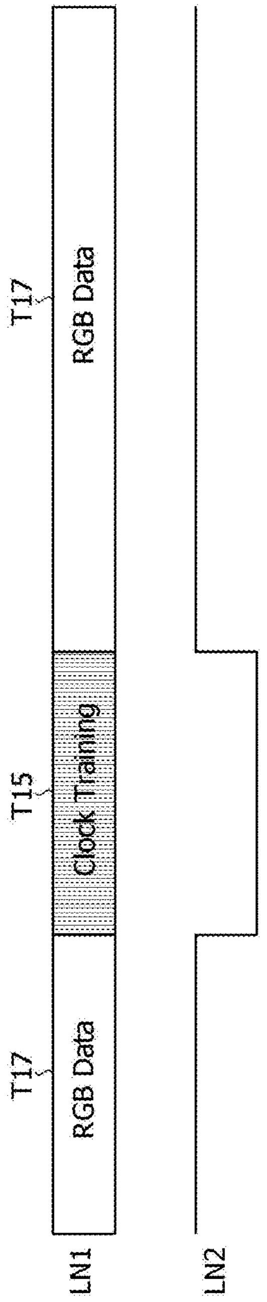
FIG. 11 shows the process of recovering communication status when a lock fail occurs in display mode.
Figure 12:
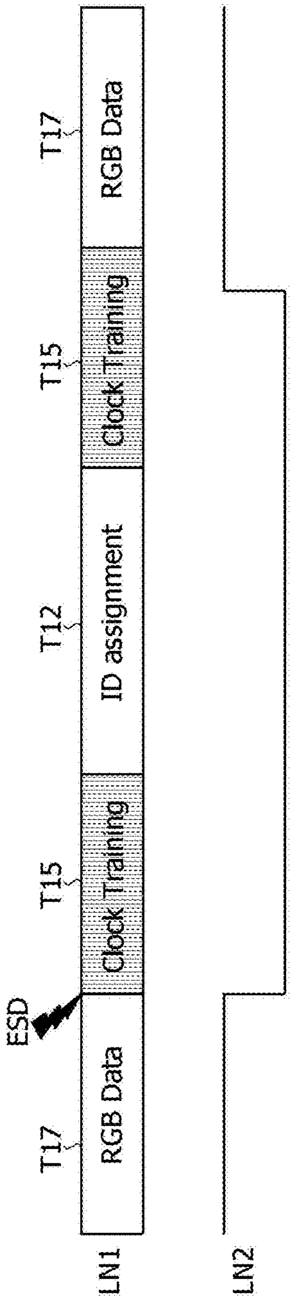
FIG. 12 shows an alternative process of recovering communication status when a lock fail occurs in display mode.

FIG. 11 is a diagram illustrating a process of recovering communication status upon lock fail in display mode according to an aspect of the present disclosure. FIG. 12 is a diagram illustrating a process of recovering communication status upon lock fail in display mode according to another aspect of the present disclosure.

Referring to FIG. 11, when a lock fail occurs due to external noise (e.g., ESD) in display mode, the data driving parts 120*a*-120*d* may change the lock signal to a low level.

When the lock signal changes to a low level, the data processing device 110 may retransmit clock training patterns T15.

If clock training is completed within a predetermined time afterward, the data driving parts 120*a*-120*d* may change the lock signal to a high level.

The data processing device 110 may detect the change of the lock signal to high level and resume transmitting image data. This configuration has the advantage of quickly recovering even when the clock of the data driving parts 120*a*-120*d* is corrupted.

Referring to FIG. 12, when a lock fail occurs due to external noise (e.g., ESD), the data driving parts 120*a*-120*d* may change the lock signal to a low level. When the lock signal changes to a low level, the data processing device 110 may retransmit clock training patterns T15.

However, the data driving parts 120*a*-120*d* may not complete clock training within a predetermined time. Alternatively, if any one of the data driving part 120*a*-120*d* does not respond even when the data processing device 110 requests status check along with the identification pattern of that data driving part 120*a*-120*d*, it may be determined that the identification pattern information stored in the memory has been damaged by external noise.

Therefore, the data processing device 110 may retransmit an ID assignment start signal to all data driving parts 120*a*-120*d* and transmit different identification patterns to each data driving part 120*a*-120*d* T12. Thereafter, if it is determined that ID recognition was performed normally by transmitting a command to the data driving parts 120*a*-120*d* for checking, the clock training phase may be performed again T15. In this way, there is an advantage of being able to quickly recover communication status by adjusting the recovery steps differently according to the degree of damage caused by external noise.

The following aspects may be combined or associated with each other in whole or in part, and various types of interlocking and driving are technically possible. The aspects may be implemented independently of each other or together in an interrelated relationship.

Although the aspects of the present disclosure have been described in more detail with reference to the accompanying drawings, the present disclosure is not necessarily limited to such aspects, and may be variously modified within the scope thereof without departing from the technical spirit of the present disclosure. Therefore, the aspects disclosed in the present disclosure are provided for illustrative purposes only and are not intended to limit the technical concept of the present disclosure, and the scope of the technical concept of the present disclosure is not limited thereto. Thus, it is intended that the present disclosure covers the modifications and variations of the aspects provided they come within the scope of the appended claims and their equivalents.

What is claimed is:

1. A data transmission and reception apparatus, comprising:

a data processing device configured to transmit a start signal for entering an identification (ID) assignment phase to a plurality of data drivers through a second communication line, and to transmit different identification patterns to the plurality of data drivers through a first communication line transmitting image data; and a data driving device including the plurality of data drivers, wherein clock recovery parts of the plurality of data drivers are configured to train the different identification patterns and recognize them as their own IDs.

2. The data transmission and reception apparatus according to claim 1, wherein the data processing device is configured to transmit commands through the second communication line to the plurality of data drivers to check if training of the identification patterns is complete, wherein the commands are transmitted together with the different identification patterns.

3. The data transmission and reception apparatus according to claim 2, wherein the plurality of data drivers are configured to simultaneously receive the commands through the second communication line, and each of the data drivers that has stored the identification pattern transmitted with the command as its ID transmits a response signal through the second communication line.

4. The data transmission and reception apparatus according to claim 3, wherein the response signal contains the identification pattern of each of the data drivers that has stored the identification pattern as its ID.

5. The data transmission and reception apparatus according to claim 2, wherein the plurality of data drivers are configured to sequentially receive the commands through the second communication line, and each of the data drivers that has stored the identification pattern transmitted with the command as its ID transmits a response signal to its neighboring data driver through a lock link of the second communication line.

6. The data transmission and reception apparatus according to claim 1, wherein the data processing device transmits a termination signal indicating completion of the ID assignment phase when transmission of the different identification patterns is complete.

7. The data transmission and reception apparatus according to claim 1, wherein the data processing device transmits clock training patterns to the plurality of data drivers for display mode operation when the ID assignment phase for the plurality of data drivers is complete.

8. The data transmission and reception apparatus according to claim 7, wherein the clock training patterns transmitted to the plurality of data drivers have a same phase and period.

9. The data transmission and reception apparatus according to claim 7, wherein the plurality of data drivers change the lock signal and transmit the lock signal to the data processing device when clock training is complete.

10. The data transmission and reception apparatus according to claim 1, wherein the plurality of data drivers recover a clock and image data in display mode by using the clock trained by the different identification patterns.

11. The data transmission and reception apparatus according to claim 1, wherein the different identification patterns differ in at least one of duty cycle and frequency.

12. A data transmission and reception method, comprising:

transmitting, by a data processing device, a start signal through a second communication line to plurality of data drivers for entering an identification (ID) assignment phase;

transmitting different identification patterns to the plurality of data drivers through a first communication line transmitting image data;

training, by clock recovery parts of the plurality of data drivers, their respectively received identification patterns and recognizing them as their own IDs.

13. The data transmission and reception method according to claim 12, further comprising:

after transmitting the different identification patterns, transmitting, by a data processing device, commands through the second communication line to the plurality of data drivers to check if training of identification patterns is complete, wherein the commands are transmitted together with the different identification patterns.

14. The data transmission and reception method according to claim 12, further comprising:

transmitting, by the data processing device, a termination signal indicating completion of the ID assignment phase when transmission of the different identification patterns is complete.

15. The data transmission and reception method according to claim 14, further comprising:

after transmitting the termination signal, transmitting clock training patterns with a same phase and period to all of the plurality of data drivers.

* * * * *